Figure 1:
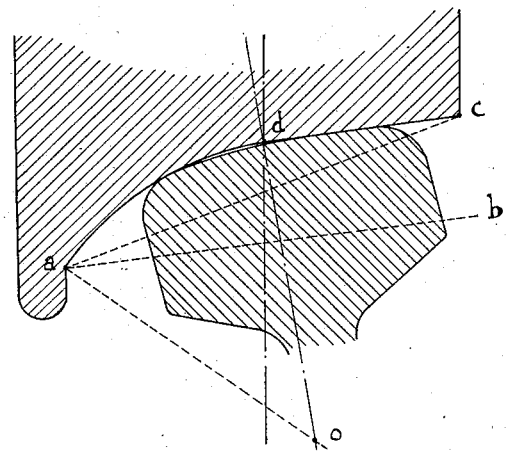

C. CODA.
WHEEL TIRE OF RAILWAY AND TRAMWAY VEHICLES.
APPLICATION FILED APR. 29, 1918.

1,293,628.

Patented Feb. 4, 1919.

Inventor
Carlo Coda
By
Atty

UNITED STATES PATENT OFFICE.

CARLO CODA, OF TURIN, ITALY.

WHEEL-TIRE OF RAILWAY AND TRAMWAY VEHICLES.

1,293,628.  Specification of Letters Patent.  Patented Feb. 4, 1919.

Application filed April 29, 1918. Serial No. 231,356.

*To all whom it may concern:*

Be it known that I, CARLO CODA, a subject of the King of Italy, of Turin, Italy, engineer, have invented certain new and useful Improvements in Wheel-Tire of Railway and Tramway Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is known that during the traveling of railway tramway and the like vehicles on curved tracks, the following inconveniences occur:

(*a*) Consumption of power and wear of fixed and rolling stock.

(*b*) Risks of derailment.

(*c*) Noises and disturbances to passengers to a far greater extent than on straight lines.

The wheels provided with conical tire and rigidly connected to each other cause their respective axles to arrange themselves automatically in the normal or radial position. In the curved tracks however, owing to the different length of the two rail lines, the radial arrangement may be obtained and maintained only on the condition that the angular space run by the external wheel corresponds exactly to the angular space run at the same time by the corresponding inner wheel.

Now on the railways tramways and the like a conicity of 1/20 has been universally adopted, which, for tires having a width of m. 0.10 makes a difference of about 1 centimeter between the greatest and the smallest diameter. Said difference in view of standardizing the rail cross section, has been adopted for any wheel diameter and any width of tires. But the conicity thus determined, while providing for the contact of the tires with the rails, these latter being inclined toward the track center, does not prevent or at least diminish the above-mentioned inconveniences.

On the base of calculations and practical experiences, I found that, to obtain a good working, the conicity of the tires should be far greater than that adopted in the general practice and ought to correspond exactly to the curve of smallest radius of the line, as this great conicity while it would allow to travel perfectly around the curves of smallest radius, would produce no inconvenience around the curves of greater radius.

But to said greater conicity of the tires ought to correspond a different tilt of the rails. Now, if it is considered that the present tilt of 1/18 of the track rails, universally adopted, may not be altered, it will be seen that the wheels of greater conicity owing to said tilt would rest only on the inner edges of the rails; therefore, without taking into account the normal wear of the fixed and rolling stock, the inner wheels could not, as it is required, roll on their smallest diameters. For this reason the said greater conicity is not convenient.

This invention has for its object a new cross-section of the tires, which eliminates the above mentioned inconveniences or reduces them if, in order to prevent possible shocks of the edges of the inner wheels against obstacles of insufficient depth, it were necessary to limit the conicity in accordance with the curves of smallest radius.

This new rail cross section comprises: the cross section of normal conicity at the outer part (for the exact adherence to the rail on straight lines or on curves of greatest radius) and conoidal at the inner part (for the section corresponding to the free space between the rail and counter rail) as it is shown diagrammatically on the annexed drawing.

This new cross-section answers to all exigencies of an automatic regular and continuous circulation and renders really useful, though no more indispensable, the use of short wheel base and bogie carriages.

Figure 2:
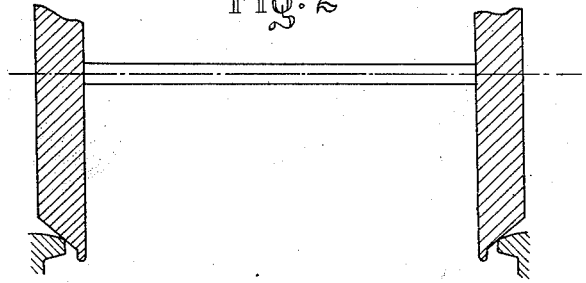
Figure 3:
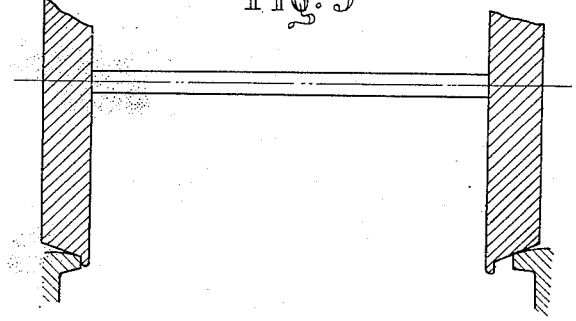

In the annexed drawing, Figure 1 shows this improved tire cross-section. Figs. 2 and 3 show diagrammatically how by making the cross section of the tire of the greatest conicity corresponding to the smallest radius of the curves around which the wheel travels, it is impossible to obtain the contact with the rails and the revolving movement of the inner wheel on its smallest diameter when the normal rail tilt is maintained.

In Fig. 1 I have shown a diagrammatic cross-section of a tramway wheel tire, but the same cross-section may be adopted for railway wheels and the like by simply increasing the outer portion having normal conicity.

The line *a. b* represents the normal conicity of 1/18 to 1/20 for tramways and 1/20 for railways and $a.\ d.\ c$ the greatest conicity corresponding to the curve of smallest radius of the track. The cross section of this improved wheel tire is determined by the line $c.\ d$ parallel to the line $a.\ b$ and having therefore a normal tilt and by the curve $a.\ d$ starting from the point $a$ of the tire, corresponding to the greatest diameter of this latter, and has its center $o$ in such a point that the line $d.\ c$ is tangent to the said curve in the point $d$ which as shown is about one-half the width of the tread. Of course the curve $a.\ d$, may be substituted by any other curve without departing from the principle of this invention.

What I claim is—

1. A railway wheel tread having a conical outer portion tangent to a portion of continually increasing conicity toward the wheel flange.

2. A railway wheel tread having a conical surface for about one-half the outer portion of the tread tangent to a conoidal surface of increasing conicity toward the flange.

In testimony that I claim the foregoing as my invention, I have signed my name.

ING. CARLO CODA.

Copies of this patent may be obtained for five cents each, by addressing the "Commissioner of Patents, Washington, D. C."